Dec. 6, 1927.
W. B. SENSEMAN
1,651,557
METHOD OF CONCENTRATING LIQUIDS
Filed April 17, 1926
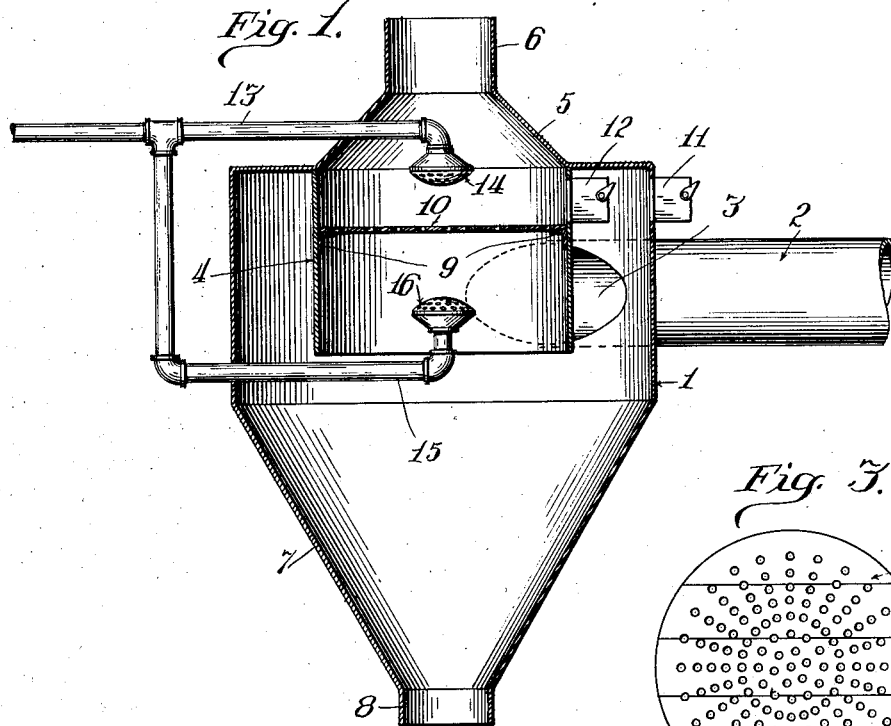
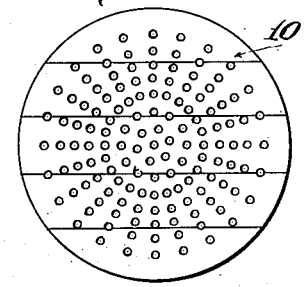
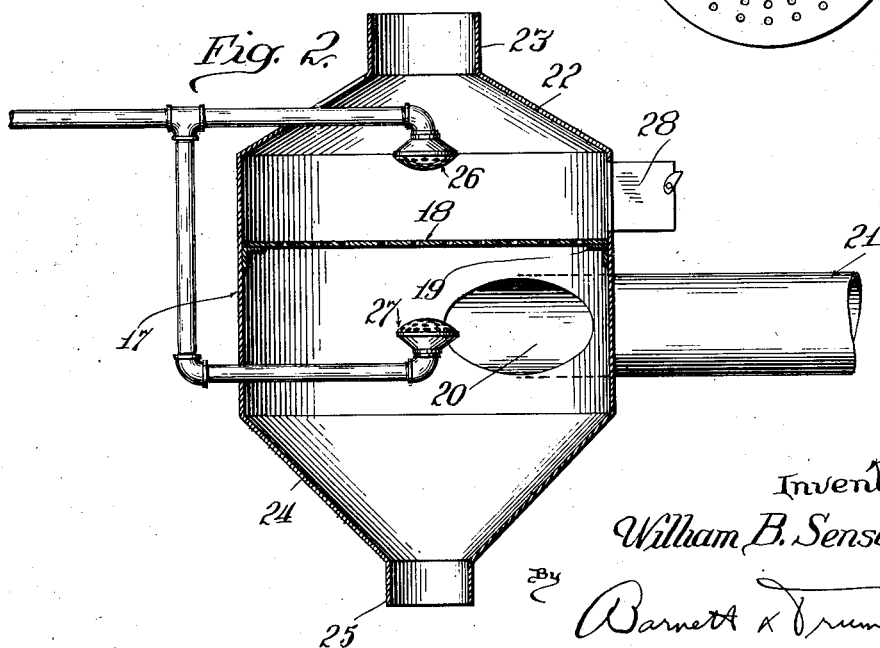
Inventor
William B. Senseman
By
Barnett & Truman
Attorneys Patented Dec. 6, 1927.

1,651,557

UNITED STATES PATENT OFFICE.

WILLIAM B. SENSEMAN, OF LOS ANGELES, CALIFORNIA.

METHOD OF CONCENTRATING LIQUIDS.

Application filed April 17, 1926. Serial No. 102,694.

This invention relates to a new and improved process for concentrating liquids, and more particularly to such a process whereby heated air or other gas is brought into more intimate contact with the liquid, to increase the temperature of the liquid, increase the rate of evaporation, and carry away the watery vapors.

In general terms, the invention consists in breaking up the liquid into a multiplicity of small streams which are sprayed through the ascending heated gases, and also maintaining a thin film of the liquid directly in the path of the gases so that the gases must pass therethrough. This film of liquid is partially supported and maintained by the whirling action imparted to the heated gases, in a manner disclosed in detail hereinafter. More specifically, a member formed with a multiplicity of small openings, such as a perforated plate or reticulated screen, is interposed across the chamber through which the whirling gases ascend, and the liquid is sprinkled against the surfaces of this plate through the whirling gases. Thus, there is provided an intimate contact of the heated gases with the liquid, both below and above the plate, and the whirling action imparted to the liquid above the plate by the whirling gases ascending therethrough, tends to maintain a complete film or layer of the liquid over this plate through which the gases must pass. Thus the area of contact between the liquid and the heated gases is generally increased, and the interval of contact prolonged so that all particles of the liquid become heated and the rate of evaporation is materially increased. The vapors are carried away by the upwardly flowing gases, and the concentrated liquid is collected from below the chamber in which this process is carried out.

The principal object of this invention is to provide an improved process for concentrating liquids, as briefly described hereinabove, and as more fully described in the detailed description which follows.

Other objects and advantages of this invention will be more apparent from the following detailed description of one approved form of apparatus, by means of which this new and improved process may be performed.

In the accompanying drawings:

Fig. 1 is a vertical central section through a preferred form of the apparatus.

Fig. 2 is a similar view of a somewhat different form of apparatus, in which this process may be performed.

Fig. 3 is a plan view of one form of the reticulated member, made in sections for convenience of removal.

Referring first to Fig. 1, the outer housing 1 has connected thereto an inlet pipe 2 for the heated gases, which are discharged tangentially into housing 1 at 3. A suitable fan or other means is provided to inject the heated gases into the housing under sufficient pressure to cause them to flow upwardly through the liquid, as hereinafter described. Concentrically mounted within the upper portion of housing 1, is an inner annular partition 4, a conical extension 5 above this partition leading to the gas outlet 6. The conical lower portion 7 of the housing 1 serves to collect the liquid and deliver same to the outlet 8.

Mounted within the inner annular member 4, on annular supporting means 9, is a reticulated member, or perforated plate 10, preferably made in sections as shown in Fig. 3. The members 1 and 4 are provided with doors 11 and 12, respectively, to afford access to the member 10, whereby it may be removed, section by section, for cleaning or replacement.

Extending into the upper conical head 5 of the casing, is a liquid supply pipe 13, terminating in a spray head 14 for discharging the liquid upon the upper surface of the reticulated member 10. A branch pipe 15 extends into the lower portion of housing 1, and is provided with a spray head 16 for discharging liquid upwardly against the lower surface of the reticulated member 10.

Referring now to Fig. 2, it will be seen that the inner annular partition 4 has been omitted. Within the housing 17 is mounted a reticulated member 18, supported by annular bracket 19, above the inlet 20, for the heated-gas pipe 21. The upper conical end 22 of casing 17 communicates with the gas outlet 23, and the lower conical portion 24 delivers the liquid to the liquid outlet 25. The spray heads 26 and 27 discharge the liquid against the upper and lower surfaces of the reticulated member 18, as in the first described form of the apparatus. A door 28 is provided in housing 17 for the removal and replacement of the sections of reticulated plate 18. It will be seen that the apparatus shown in Fig. 2 is substantially the same as the preferred form of apparatus shown in Fig. 1, except that it has been simplified by the omission of the inner annular partition 4.

In operation, the liquid to be concentrated is caused to flow into the apparatus through supply pipe 13, and is sprayed onto the upper and lower surfaces of the reticulated member. The heated gases are forced into the housing under pressure, and since they enter the housing tangentially, a whirling movement of the gases within the housing is produced.

In Fig. 1 this whirling movement of the gases is first between the outer wall of housing 1 and the inner annular partition 4, after which they pass up beneath partition 4 and through the space within this partition and the reticulated member or perforated plate 10. In the form of apparatus used in Fig. 2, the whirling action affects the gases in the entire space beneath reticulated plate 18. Since the reticulated member is thin, and the holes or perforations are numerous, the air or gases pass through these perforations in an upwardly inclined direction so that the whirling movement is imparted to the gases above the reticulated member, as well as below. The liquid that is sprayed on top of the perforated plate must pass downwardly through the perforations and its travel is therefore retarded, and the whirling movement of the gases passing up through the perforations is imparted to this liquid so that a whirling film or head of liquid is maintained constantly above the screen or reticulated member. The depth of this whirling head or film of liquid is controlled by the pressure of the heated gases, the volume of the liquid discharged above the screen, and the size and number of the perforations in the screen. It is desirable to maintain a thin but continuous and uninterrupted film of liquid above the screen.

It will be seen that the heated gases are caused to pass with a whirling movement through the sprays of the liquid both below and above the reticulated member, and also must pass through the film of this liquid maintained above the screen. In this way, every portion of the heated gases must have a prolonged and intimate contact with the liquid, which liquid is also repeatedly broken up so that substantially all portions thereof come into contact with the heated gases. The downward passage of the liquid through the apparatus is also prolonged by the supporting action of the whirling gases, and the maintenance of the liquid film above the screen. In this way, the temperature of the liquid is considerably raised by heat absorbed from the gases, and the intimate contact of the gases therewith increases the rate of evaporation and carries away the vapors formed. The lower spray heads 16 or 27 may be omitted, and all of the liquid caused to pass downwardly from above through the reticulated member.

Although hot air will ordinarily be used in this process, other heated gases which are available may be used, provided they are not such as to chemically affect the liquid which is to be concentrated. Exhaust gases, or heated air or gases whose heat is otherwise wasted, will ordinarily be available, and may be used in this concentrator so that the cost of supplying heat to the apparatus will be eliminated. In tropical or desert countries, where mines are apt to be located, the ordinary outer air will be at a sufficiently high temperature to serve its purpose in this apparatus, and it is only necessary to provide a fan for forcing this outer air through the concentrator.

I claim:

1. The method of concentrating a liquid which consists in confining and supporting at spaced intervals throughout its entire area a thin film of the liquid in a horizontal plane, and causing heated gases to be projected upwardly with a whirling movement against the unsupported portion of the under side of the liquid film the gases causing the liquid to rotate in its own plane.

2. The method of concentrating a liquid which consists in confining and supporting at spaced intervals throughout its entire area a thin film of the liquid in a horizontal plane, spraying liquid upon the upper surface of the film to replenish the liquid drawn by gravity from the lower portion of the film, and projecting heated gases with a whirling motion beneath the lower face of the film, whereby the gases tend to support the otherwise unsupported portions of the film before they pass upwardly therethrough.

3. The method of concentrating a liquid which consists in confining and supporting at spaced intervals throughout its entire area a thin film of the liquid in a horizontal plane, spraying liquid upon the upper surface of the film to replenish the liquid drawn by gravity from the lower portion of the film, and projecting heated gases with a whirling motion beneath the lower face of the film, whereby the gases cause the liquid film to rotate in its own plane, and thus assist in temporarily supporting the liquid before they pass upwardly therethrough.

4. The method of concentrating a liquid which consists in confining and supporting at spaced intervals throughout its entire area a thin film of the liquid in a horizontal plane, spraying liquid upon the upper surface of the film to replenish the liquid drawn by gravity from the lower portion of the film, and projecting heated gases upwardly with a whirling movement through the liquid falling from the film and thence against the lower face of the film, whereby the gases cause the film to rotate in its own plane and assist in partially supporting the liquid, the heated gases eventually passing upwardly through the film and through the upper liquid spray.

WILLIAM B. SENSEMAN.